United States Patent
Linz et al.

(10) Patent No.: US 6,913,165 B2
(45) Date of Patent: Jul. 5, 2005

(54) COCKTAIL SHAKER

(76) Inventors: Kerry Linz, 20624 Torrence Ave., Lynwood, IL (US) 60411; Chui Ying Ko, c/o Phoenix Industries, Unit C, 18/F., Easy Tower, 609 Tai Nan West Street, Cheung Sha Wan, Kowloon (HK)

( * ) Notice: Subject to any disclaimer, the term of this patent is extended or adjusted under 35 U.S.C. 154(b) by 80 days.

(21) Appl. No.: 10/264,724

(22) Filed: Oct. 7, 2002

(65) Prior Publication Data

US 2004/0066705 A1 Apr. 8, 2004

(51) Int. Cl.⁷ .................................................. B01F 11/00
(52) U.S. Cl. ................ 220/568; 220/592.16; 220/592.2; 220/665; 220/804; 366/130; 222/189.07
(58) Field of Search ......................... 220/568, 662, 220/665, 803, 804, 806, 592.2, 592.27, 903, 592.16; 366/130; 222/131, 189.07; 215/12.1, 13.1; D7/300.1

(56) References Cited

U.S. PATENT DOCUMENTS

| | | | | |
|---|---|---|---|---|
| 288,775 A | * | 11/1883 | Cherry | 220/568 |
| 300,867 A | * | 6/1884 | Hauck | 366/130 |
| 723,796 A | * | 3/1903 | Williams | 220/592.17 |
| 1,042,751 A | * | 10/1912 | Barker | 220/568 |
| 1,706,034 A | * | 3/1929 | Moore | 215/11.6 |
| 1,765,129 A | * | 6/1930 | Cooke | 220/568 |
| 1,966,611 A | * | 7/1934 | Cobel | 222/189.07 |
| 1,968,263 A | * | 7/1934 | Reuther | 215/12.1 |
| 2,010,725 A | * | 8/1935 | Kircher | 220/568 |
| 2,090,320 A | * | 8/1937 | Amick | 215/12.1 |
| 2,090,998 A | * | 8/1937 | Gessler | 40/324 |
| 2,433,248 A | * | 12/1947 | Sweier, Jr. | 366/147 |
| 2,725,733 A | * | 12/1955 | Davis | 215/12.1 |
| 3,677,524 A | * | 7/1972 | Douglas | 366/130 |
| 3,718,229 A | * | 2/1973 | Wyeth et al. | 215/373 |
| 4,870,837 A | * | 10/1989 | Weins | 62/457.4 |
| 4,872,764 A | * | 10/1989 | McClean | 366/251 |
| 6,050,443 A | * | 4/2000 | Tung | 220/592.17 |
| D480,590 S | * | 10/2003 | Linz et al. | D7/300.1 |
| D480,599 S | * | 10/2003 | Linz et al. | D7/392 |
| D483,981 S | * | 12/2003 | Linz et al. | D7/300.1 |

FOREIGN PATENT DOCUMENTS

DE  1 532 615 B  * 2/1970

* cited by examiner

Primary Examiner—David Sorkin
(74) Attorney, Agent, or Firm—Martin Faier; Faier & Faier PC

(57) ABSTRACT

A Cocktail shaker which has a head adapted for releasably sealing an insulated container, having at least one plastic wall, where the container may be used as a drinking vessel. The cocktail shaker head has a metal selectively closeable stainer or filter portion and an integral reinforcement body portion carrying a flexible sealing gasket which has multiple ribs for releasably sealing the shaker top onto the container. The container has double insulating walls including a stand-off within the walls spacing the walls apart, and a smooth metallic lip seal joining the walls together to create a smooth lip on the container, and which is adapted to receive the shaker top sealing gasket. The plastic and metal portions of the shaker head and container have shoulder stepped connections for securing the respective plastic and metal parts together.

12 Claims, 2 Drawing Sheets

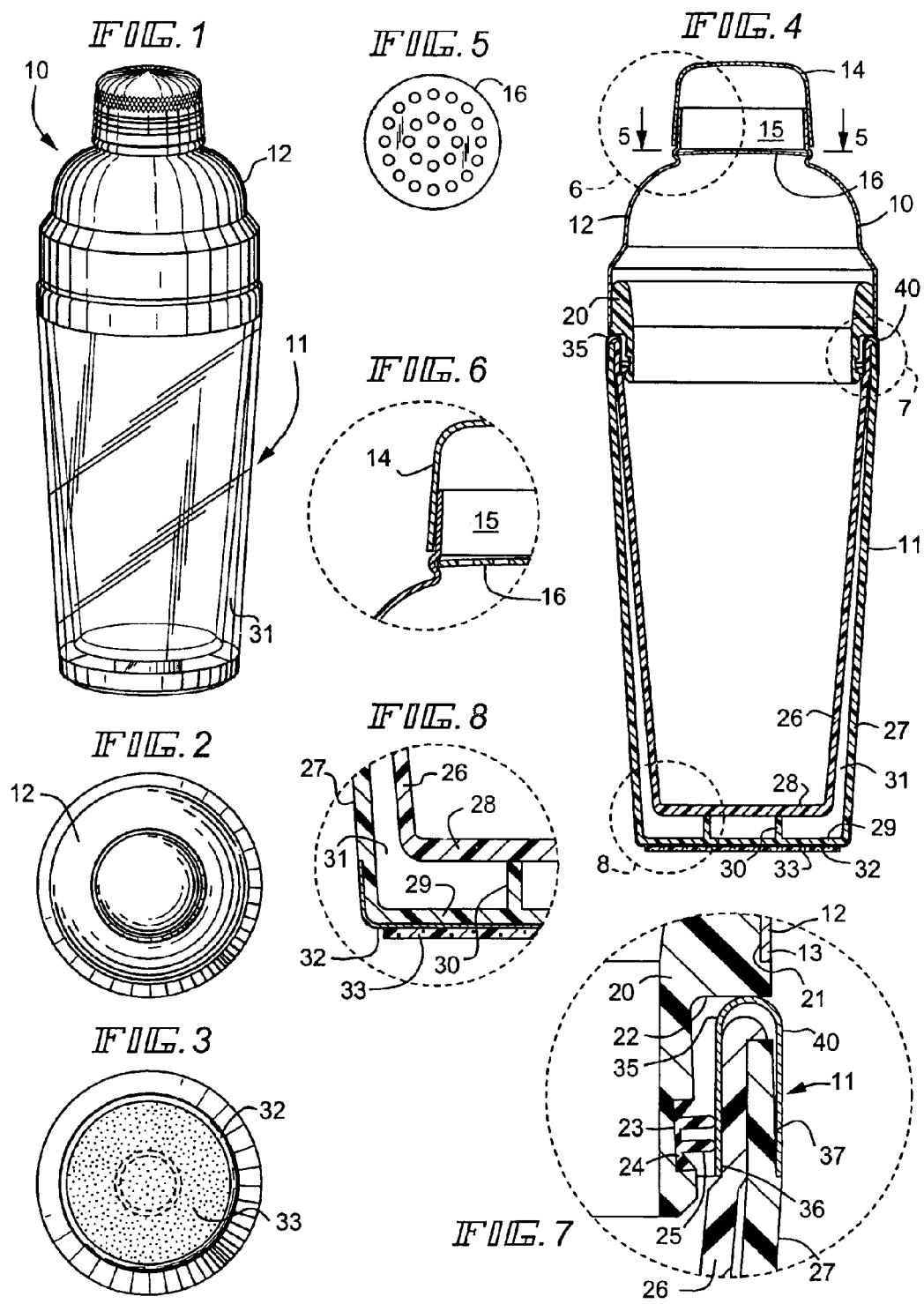

COCKTAIL SHAKER

This invention relates to cocktail shakers used for mixing drinks and the like, and is more particularly directed to Such a cocktail shaker useful as a container or vessel for drinking when the shaker head is removed. Such a cocktail shaker also has double walls which insulate the container. The cocktail shaker head selectively closes the container, and has novel sealing means which form a tight seal adapted for closing the container irrespective of small variations in shape or diameter.

BACKGROUND AND SUMMARY OF THE INVENTION

Many mixed drinks require use of a cocktail shaker to properly make them. Conventional cocktail shakers are usually constructed with a container for receiving liquids and/or solids, such as ice, to be mixed, and a shaker head for closing the shaker during mixing. Most shaker heads have a strainer or filter which may be selectively closed during mixing and opened upon the completing of mixing to permit the mixed drink to be poured from the container, without spilling ingredients intended to remain in the container. Most cocktail shakers have a shaker top overlying the drink container which must have close tolerances to seal the container rim, so that liquids will not leak during shaking or mixing. To avoid leakage, many containers and tops have precise screw fits or bayonet type joinders and others are fabricated so that the shaker head fits tightly over and into the container rim. Examples of such arrangements can be found in early prior art patents, such as Gessler U.S. Pat. No. 2,090,998, Amick U.S. Pat. No. 2,090,320, or Kircher U.S. Pat. No. 2,010,725, where the shaker top fits over the container rim and screw fastens to it.

Some cocktail shakers have exotic design to cause foam to form in the mixed drink and require interior baffles to foam the liquid, see Gasser et al U.S. Pat. No. 6,332,704, while other prior art devices induce swirling of the beverage in the container, Douglas U.S. Pat. No. 3,677,524, or reversible blending, Lillelund et al U.S. Pat. No. 5,547,275. Straws or similar devices are included in some prior art cocktail shakers for extracting the mixed drink from the cocktail shaker without a strainer or filter, Zimmerman et al U.S. Pat. No. 5,419,429.

Some cocktail shakers have been formed from plastic, see Swett et al U.S. Pat. No. 3,820,692, but it is preferable to have the shaker top fabricated from metal, such as aluminum or stainless steel, which inhibit discoloration from the shaker contents. Prior art cocktail shakers also have double wall containers, to insulated the mixed drink and permitting the container to be easily held without transmitting heat or cold from or into the container, see Jacobs U.S. Pat. No. 2,387,151

BRIEF DESCRIPTION OF THE INVENTION

In the cocktail shaker embodying the present invention, the shaker head fits within the circumferential edge of its container and has multiple seals, to provide suitable removable closing for the shaker, thus preventing leakage during mixing and allowing suitable tolerances for containers of different circumferences or roundness. The shaker container portion of this novel combination may have a smooth rounded reinforced edge portion making it suitable for drinking, and this edge portion secures together the double walls of the container. Multiple seals for the shaker head preferably are rubber-like to accommodate containers within tolerance limits.

The container portion of the present novel cocktail shaker may be molded from clear or translucent plastic, permitting the user to see the container interior, and also to provide a novel appearance. Such a container may also be colored. The container wall may be fabricated with an internal integral stand-off to prevent collapse of the container and maintain the walls spaced apart to insulate the container. This structure also permits formation of an integral cork-like coaster at the bottom of the container, to inhibit a hot, cold or wet container damaging surfaces upon which it may be placed.

Preferably, the cocktail shaker head embodying the present invention has an integral strainer with an overlying closure cap permitting mixed drinks to be poured through the strainer and out of the shaker head, without opening the container. The cocktail shaker embodying this invention is relatively simple, but has great utility for its double wall insulation can be molded from plastic, translucent, clear or colored, reinforced with or having an inner wall of stainless steel. An integral coaster may be formed or applied to the bottom container wall. Another novel feature of the invention is the cylindrical plastic reinforcement portion integral with the stainless steel dome portions of the shaker head which keeps the shaker head round or in a shape for overlying the rim of the shaker container and to provide a surface into which the lip seal gasket, preferably a silicon washer, fits. Variations in the container design may be made, as the container can be cylindrical or rectangular in cross section, and may be used with the novel shaker head having the flexible seals described above.

OBJECTS AND ADVANTAGES OF THE INVENTION

It is the object of the present invention to provide a cocktail shaker of the character described.

Another object is to provide a novel cocktail shaker head adapted to removably seal within the circumferential walls of its cocktail shaker container.

Another object is to provide a novel multiple seal for a cocktail shaker head and container.

Another object is to provide a novel shaker head which includes a body for maintaining the shaker head round or in a shape for sealing the container, and having a channel into which a flexible lip seal member fits.

Another object is to provide a smooth rounded cocktail shaker lip which secures together insulating walls of a cocktail shaker container.

Another object is to provide insulated double walls for a cocktail shaker container which has integral stand-off devices for maintaining the walls in a predetermined spaced apart relationship.

Another object is to provide a cocktail shaker fabricated with an integral coaster on the bottom wall of its container.

Another object is to provide a cocktail shaker with a container portion which can be formed with a wall of clear, colored or translucent plastic.

Another object is to provide a container for a cocktail shaker formed of plastic parts which interlock with metallic parts to form a novel cocktail shaker head and container.

Another object is to provide a novel cocktail shaker which is attractive, and efficient in use, and which may be efficiently manufactured economically using conventional techniques.

These and other objects and advantages of the invention will become more apparent as this description proceeds, taken in conjunction with the accompanying drawings.

BRIEF DESCRIPTION OF THE DRAWINGS

FIG. 1 is a perspective view of a cocktail shaker embodying the present invention.

FIG. 2 is a top elevational view of the cocktail shaker head.

FIG. 3 is a bottom elevational view of the cocktail shaker bottom.

FIG. 4 is a sectional view of the cocktail shaker embodying the present invention.

FIG. 5 is a view of the cocktail shaker head sifter or filter taken on line 5—5 if FIG. 4.

FIG. 6 is a detail sectional view of the cocktail shaker head broken out of the circular dotted line of FIG. 4. marked 6

FIG. 7 is a detail sectional view of the seal between the cocktail shaker head and container broken out of the circular dotted lines of FIG. 4 marked 7.

FIG. 8 is a sectional view of the bottom of the container showing the double walls and standoff, broken out of the circular dotted lines of FIG. 4 marked 8.

DESCRIPTION OF PREFERRED EMBODIMENTS

Figure 9:
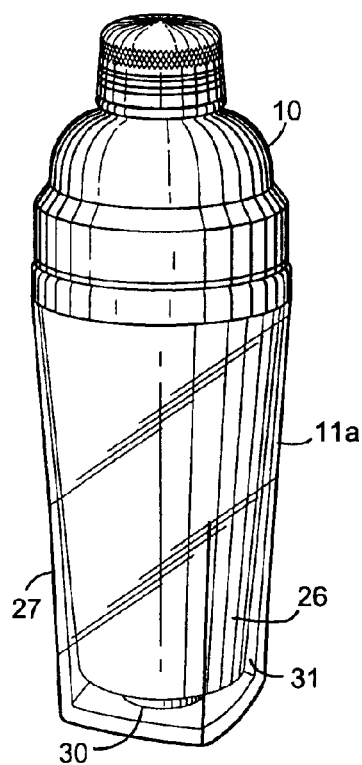
FIG. 9 is a perspecive view of a cocktail shaker embodying the present invention having a container fabricated from clear plastic and having a rectangular cross-section.
Figure 11:
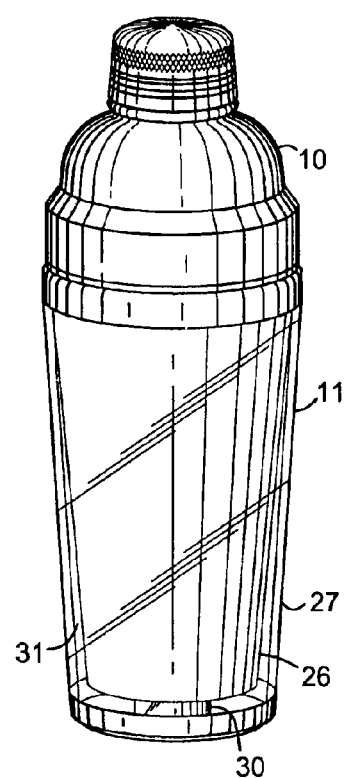
FIG. 11 is a perspective view of a cocktail shaker embodying the present invention having a container fabricated from clear plastic and having a cylindrical cross section or having an exterior plastic wall and an inner stainless steel or metallic wall.
Figure 12:
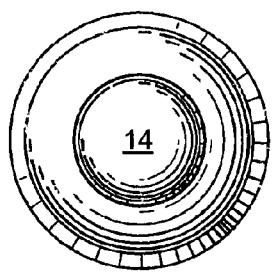
FIG. 12 is a view of the cocktail shaker top, which is common to the cocktail shakers shown in FIGS. 9 and 11.

With reference to the accompanying drawing, and particularly to FIGS. 1 and 4, a cocktail shaker embodying the present invention comprises a shaker head 10 and a container 11. The shaker head 10 may comprise a stainless steel portion or dome 12 which consists of a body 13 and a cover 14 of reduced diameter which fits over a neck 15 extending from the body 13. At the base of the neck 15 spanning the body is a filter or strainer 16, which will permit liquid to flow out of the shaker, but which will hold back solids, such as ice or fruit pieces.

The stainless steel portion 12 of the shaker head remote from the cover 14 and neck 15, is connected to a cylindrical member 20, preferably fabricated from plastic, which includes a stepped portion 21 reinforcing the stainless steel portion 12, thus maintaining the diameter of the shaker head and preventing collapse of the stainless steel portion during use, and a flange-like wall portion 22 which overlies the container 11. This cylindrical member 20 has a channel 23 on its periphery into which is secured a flexible gasket 24 which includes two outwardly extending seal ribs 25, which have a length sufficient to fit within the container 11, irrespective of small tolerances in the diameter of the container. Preferably the metallic parts of the cocktail shaker are fabricated from 18/8 stainless steel.

The shaker container 11 comprises wall portions 26 and 27 and bottom portions 28 and 29, respectively, which are spaced apart to insulated materials, such as ice, liquor and fruit and other drink mix materials, placed in the container for drink preparation. The bottom portions 28 and 29 have arranged therebetween stand-offs 30, which maintain insulating air space 31 between the walls 26 and 27 and bottom portions, and the underside 32 of the exterior bottom 29 carries an integral cork-like coaster 33. The mouth 35 of the container 11 is of reduced thickness, at 36 and 37 on each wall 26 and 27, to receive an integral smooth stainless steel lip channel 40 thereover. When the shaker head 10 is seated on the container mouth 35, this lip channel 40 is sealed by the seal ribs 25 and at the flange-like wall portion 22. This arrangement permits easy opening and closing of the shaker head 10 within the container 11, and seals the closure of the head and container during use, so that fluids will not leak from the cocktail shaker during mixing, The interior container wall 26 may be fabricated from stainless steel or like metal, in which case the channel 40 may be formed hook-like integral with that wall 26.

Figure 10:
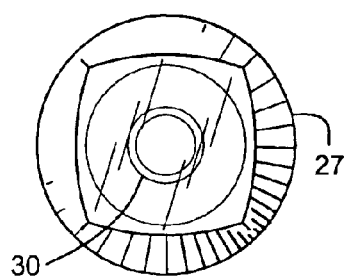
FIG. 10 is a bottom elevational view of the cocktail shaker shown in FIG. 9.
Figure 13:
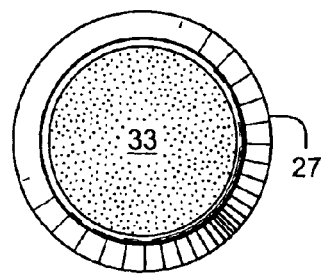
FIG. 13 is a bottom view of the cocktail shake container shown in FIG. 11.

The cocktail shaker arrangement described above permits the fabrication of the shaker container 11 is many ways. For example, the container may have round and tapered cross sections as shown in FIGS. 1, 4, and 6, or it may be partially of a square to similar cross section and shown in FIGS. 9 and 10. The container may be fabricated of clear see-through plastic, permitting one to view the progress of drink mixing, or it may be opaque or tinted, or one of the walls 26 may be fabricated from stainless steel or like metal. The container may be used as a drinking vessel, with a coaster bottom to inhibit marring of furniture or the like, the container mouth 35, being smooth, is comfortable on the lips of a person drinking from it.

Preferably, the plastic portions of the cocktail shaker described may be fabricated from SAN (styrene acrylic nitrite copolymers), acrylic, or polystyrene.

While preferred embodiments of the invention have been shown and described in considerable detail, many variations and changes in the structures shown and described may be made without departing from the nature and spirit of the invention. Accordingly, it is not desires that the invention should be limited to the exact structure disclosed.

What is claimed is:

1. A cocktail shaker far mixing drinks comprising
   (1) a shaker top consisting of
      a. a dome portion, said dome portion having an opening at one end for pouring mixed drinks from said shaker, and
      b. a separate cylindrical portion secured to said dome portion remote from said one end opening, said cylindrical portion having
         (i) a stepped portion for receiving said dome portion thereover and
         (ii) a channel on the periphery of said cylindrical portion; and
   (2) a container for receiving drink materials for mixing, said container consisting of
      a. spaced apart insulating wails, and
      b. a smooth circumferential lip bridging and securing said walls together; and
   (3) a sealing gasket seated in said peripheral channel, said sealing gasket having flexible ribs extending from said channel adaptable to removably seal said cylindrical portion within said container when said top is installed within said container.

2. The cocktail shaker recited in claim 1, which said lip is metal.

3. In the cocktail shaker recited in claim 1, wherein one of said walls at said lip has a recessed shoulder for receiving said bridging structure thereover.

4. In the cocktail shaker recited in claim 3, wherein said cylindrical member has a recessed shoulder for receiving said dome portion thereover and said gasket therein.

5. In the cocktail shaker recited in claim 3, wherein at least one of said insulating walls is translucent.

6. In the cocktail shaker recited in claim 5, wherein said translucent insulating wall is formed from co-polymer plastic.

7. In the cocktail shaker recited in claim 6, wherein said plastic wall is tinted.

8. In the cocktail shaker recited in claim 1, wherein said lip and gasket are cooperatingly dimensioned to permit said lip to engage said cylindrical portion when said shaker top and container are secured together.

9. The cocktail shaker recited in claim 1, wherein said shaker top is press fit within said container.

10. In the cocktail shaker recited in claim 1, wherein said dome portion is metallic.

11. In the cocktail shaker recited in claim 1, wherein said dome portion has a strainer arranged over said opening permitting liquids to flow freely from said shaker when said top and container are secured together.

12. In the cocktail shaker recited in claim 11, wherein removable cover closes said strainer to inhibit withdrawal of liquids when in closed position.

* * * * *